(12) United States Patent
Yadav et al.

(10) Patent No.: US 11,342,548 B2
(45) Date of Patent: May 24, 2022

(54) ZINC ELECTRODES WITH HIGH CAPACITY UTILIZATIONS

(71) Applicant: RESEARCH FOUNDATION OF THE CITY UNIVERSITY OF NEW YORK, New York, NY (US)

(72) Inventors: Gautam G. Yadav, New York, NY (US); Jungsang Cho, New York, NY (US); Xia Wei, New York, NY (US); Michael Nyce, New York, NY (US); Sanjoy Banerjee, New York, NY (US)

(73) Assignee: RESEARCH FOUNDATION OF THE CITY UNIVERSITY OF NEW YORK, New York City, NY (US)

( * ) Notice: Subject to any disclaimer, the term of this patent is extended or adjusted under 35 U.S.C. 154(b) by 168 days.

(21) Appl. No.: 16/692,967

(22) Filed: Nov. 22, 2019

(65) Prior Publication Data
US 2020/0411846 A1    Dec. 31, 2020

Related U.S. Application Data

(60) Provisional application No. 62/895,706, filed on Sep. 4, 2019, provisional application No. 62/877,528, filed on Jul. 23, 2019, provisional application No. 62/867,959, filed on Jun. 28, 2019.

(51) Int. Cl.
*H01M 4/10*    (2006.01)
*H01M 4/134*   (2010.01)
*H01M 10/24*   (2006.01)
*H01M 4/02*    (2006.01)

(52) U.S. Cl.
CPC ........... *H01M 4/134* (2013.01); *H01M 10/24* (2013.01); *H01M 2004/027* (2013.01)

(58) Field of Classification Search
CPC ........ H01M 4/46; H01M 10/24; H01M 4/625; H01M 4/628; H01M 2300/0002
See application file for complete search history.

(56) References Cited

U.S. PATENT DOCUMENTS

| | | | |
|---|---|---|---|
| 2011/0033747 A1* | 2/2011 | Phillips | H01M 4/625 429/212 |
| 2015/0244031 A1* | 8/2015 | Adamson | H01M 4/50 429/188 |
| 2017/0301960 A1* | 10/2017 | Menard | H01M 10/28 |
| 2018/0277899 A1* | 9/2018 | Takami | H01M 10/0568 |

* cited by examiner

*Primary Examiner* — Cynthia H Kelly
*Assistant Examiner* — Monique M Wills
(74) *Attorney, Agent, or Firm* — Andrew Metrailer; Conly Rose, P.C.

(57) ABSTRACT

A zinc electrode comprises an anode material, the anode material comprising: an electroactive material comprising at least one of zinc or a compound comprising zinc, a stabilizer additive comprising at least one of: bismuth, copper, indium, a compound comprising bismuth, a compound comprising copper, a compound comprising indium, or any combination thereof, a conductive additive, and a binder.

31 Claims, 11 Drawing Sheets

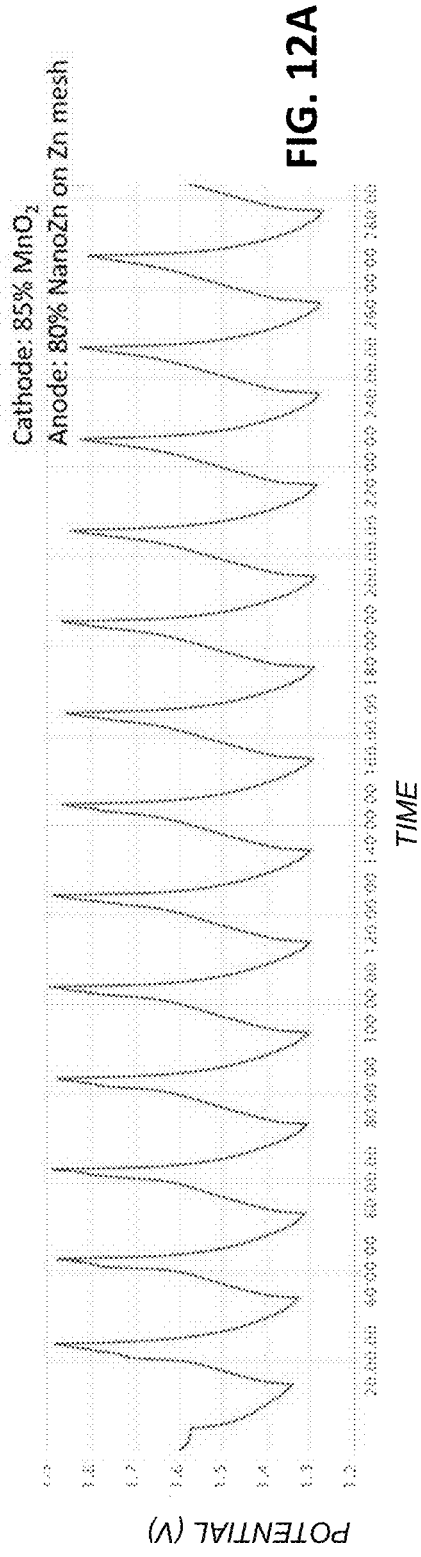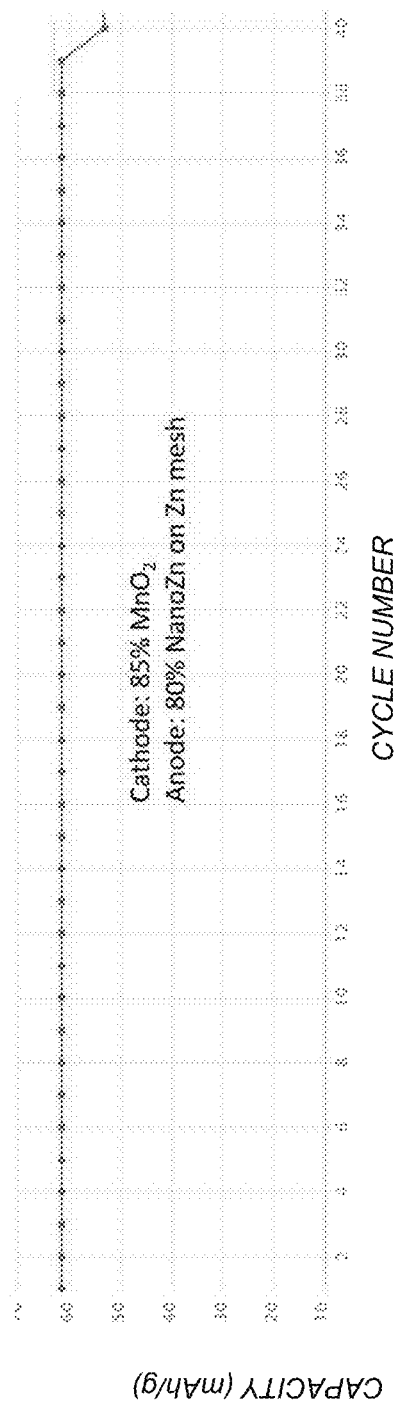
FIG. 12A
FIG. 12B

ZINC ELECTRODES WITH HIGH CAPACITY UTILIZATIONS

CROSS-REFERENCE TO RELATED APPLICATIONS

This application claims priority to: 1) U.S. Provisional Application No. 62/867,959, filed on Jun. 28, 2019, and entitled, "Membrane-less High Voltage Aqueous Manganese Dioxide Battery," 2) U.S. Provisional Application No. 62/877,528, filed on Jul. 23, 2019, and entitled "High Voltage MnO2/Zn and MnO2/Al Battery Using Permanganate and Gelled Alkaline Electrolyte," and 3) U.S. Provisional Application No. 62/895,706, filed on Sep. 4, 2019, and entitled, "Complete Solid State High Voltage Aqueous Battery with High Ionic Conductivity," all three of which are incorporated herein by reference.

STATEMENT REGARDING GOVERNMENTALLY SPONSORED RESEARCH OR DEVELOPMENT

Not applicable.

BACKGROUND

This disclosure relates to batteries including electrochemical cells. Alkaline cells have been predominantly used as primary batteries. However, the one-time use of primary batteries results in large material wastage as well as undesirable environmental consequences. Also, potential economic losses can arise due to the significant imbalance between the energy that is required to manufacture these cells compared to the energy that can be actually stored. As a consequence, there is a clear advantage to provide rechargeable or secondary cells.

As a form of alkaline cells, zinc-anode batteries have dominated the primary battery market since its invention. However, the rechargeable version of this chemistry has met with only limited success. This is in part due to various problems with short cycle life and shorting that can occur with alkaline cells using zinc anodes.

SUMMARY

In some embodiment, a zinc electrode comprises an anode material, the anode material comprising: an electroactive material comprising at least one of zinc or a compound comprising zinc, a stabilizer additive comprising at least one of: bismuth, copper, indium, a compound comprising bismuth, a compound comprising copper, a compound comprising indium, or any combination thereof, a conductive additive, and a binder.

In some embodiments, a battery comprises a zinc electrode, wherein the zinc electrode comprises: an electroactive material comprising at least one of zinc or a compound comprising zinc, a stabilizer additive comprising at least one of: bismuth, copper, indium, a compound comprising bismuth, a compound comprising copper, a compound comprising indium, or any combination thereof, a conductive additive; and a binder, a cathode, an electrolyte, and a separator disposed between the anode and the cathode.

In some embodiments, a method of operating a battery comprises discharging a battery, and charging the battery after discharging the battery. The battery comprises a zinc electrode, wherein the zinc electrode comprises an electroactive material comprising at least one of zinc or a compound comprising zinc, a stabilizer additive comprising at least one of: bismuth, copper, indium, a compound comprising bismuth, a compound comprising copper, a compound comprising indium, or any combination thereof, a conductive additive, and a binder, a cathode, an electrolyte, and a separator disposed between the anode and the cathode. The zinc electrode can be utilized between 10-100% of its theoretical capacity of 820 mAh/g during the discharging of the battery.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 12A illustrates potential-time curves for the cell as described in Example 5.

FIG. 12B illustrates a capacity retention chart for the cell as described in Example 5.

DESCRIPTION

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused.

Zinc (Zn) electrodes are popular as anodes in a number of battery chemistries because of its high theoretical capacity of 820 mAh/g, material abundance, and non-toxicity. However, zinc is mostly used in primary alkaline batteries like $MnO_2$/Zn, Ni/Zn or Air/Zn because of its poor rechargeable characteristics. In rechargeable versions, it is used with extremely reduced capacity utilization of less than 10% of its theoretical capacity. Its main problems have been poor electronic conductivity, capacity loss due to Zn redistribution, and dendrite formation. As disclosed herein, a number of strategies, compositions, and processes are disclosed to improve Zn capacity utilization to 50-100% of its theoretical capacity—for example, including the use of a conductive additive such as carbon nanotubes in the anode to form nested structures around Zn particles to improve conductivity, including a complexing additive such as a compound comprising zincate ions in the electrolyte to reduce Zn redistribution, using Zn particles of sizes in the nanometer range to increase surface area and thus, allow more Zn surface area to contact with the electrolyte, and using current collectors made of Zn, Bi and/or Cu to improve Zn plating and thus, reduce dendrite formation.

Figure 1:
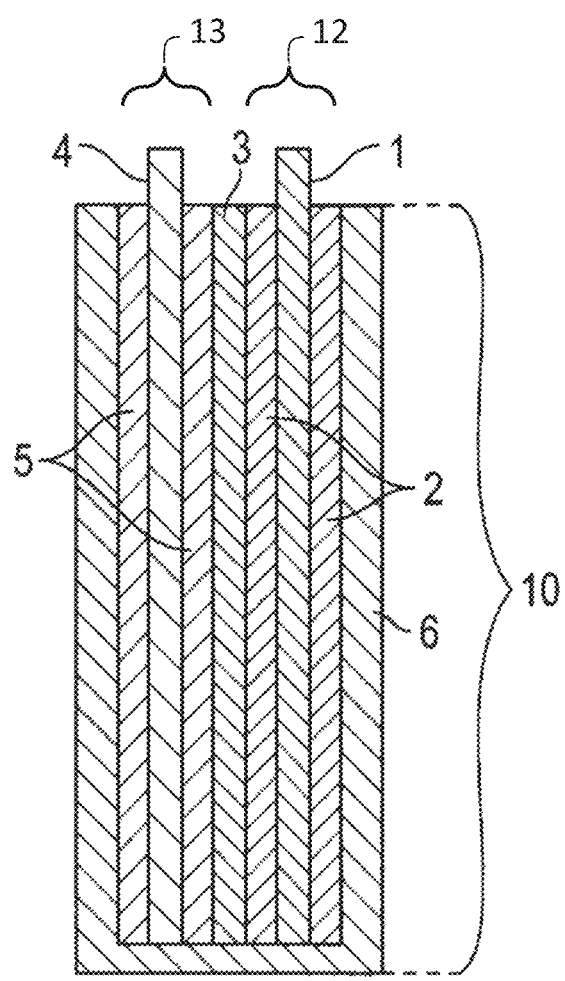
FIG. 1 schematically illustrates a battery according to an embodiment.
Figure 2:
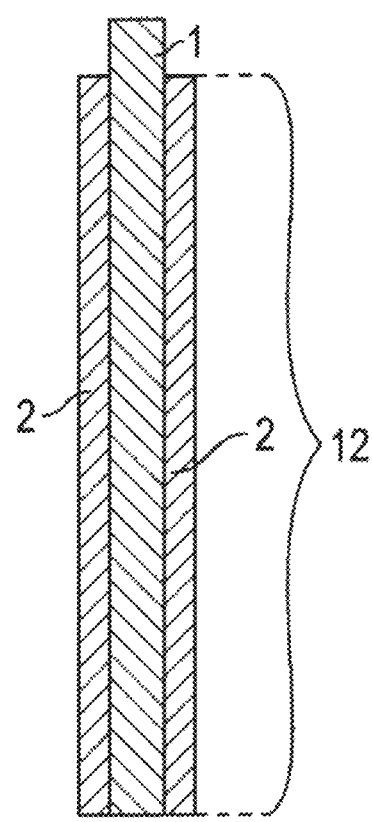
FIG. 2 schematically illustrates an electrode according to an embodiment.
Figure 3:
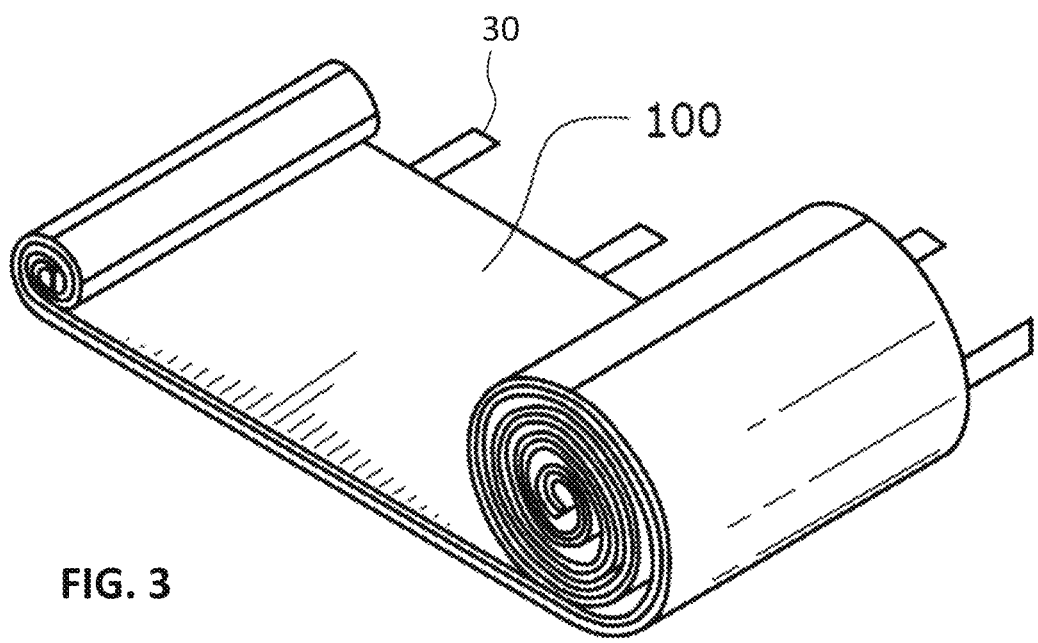
FIG. 3 schematically illustrates another battery according to another embodiment.

Referring to FIG. 1, a battery 10 can have a housing 6, a cathode 12, which can include a cathode current collector 1 and a cathode material 2, a separator 3, and an anode 13. In some embodiments, the anode 13 can comprise an anode current collector 4, and an anode material 5. FIG. 1 shows a prismatic battery arrangement having a single anode 13 and cathode 12. In another embodiment, the battery can be a cylindrical battery (e.g., as shown in FIG. 3) having the electrodes arranged concentrically or in a rolled configuration in which the anode and cathode are layered and then rolled to form a jelly roll configuration. An electrolyte can be dispersed in an open space throughout battery 10. The cathode current collector 1 and cathode material 2 are collectively called either the cathode 12 or the positive electrode 12, as shown in FIG. 2. Similarly, the anode material 5 with the optional anode current collector 4 can be collectively called either the anode 13 or the negative electrode 13.

In some embodiments, the battery 10 can comprise one or more cathodes 12 and one or more anodes 13. When a plurality of anodes 13 and/or a plurality of cathodes 12 are present, the electrodes can be configured in a layered configuration such that the electrodes alternate (e.g., anode, cathode, anode, etc.). Any number of anodes 13 and/or cathodes 12 can be present to provide a desired capacity and/or output voltage. In the jelly roll configuration, the battery 10 may only have one cathode 12 and one anode 13 in a rolled configuration such that a cross section of the battery 10 includes a layered configuration of alternating electrodes.

The battery 10 comprises at least one anode 13 having an anode electroactive material comprising of zinc. The material for the zinc electrode can be zinc in a number of forms including, but not limited to, zinc (e.g., metallic zinc), zinc oxide, zinc sulfide, zinc selenide, zinc telluride, zinc antimonide, zinc manganese dioxide, zinc iron oxide, zinc iron phosphate, zinc aluminum oxide, brass, an alloy comprising (1) zinc and aluminum, (2) zinc and magnesium, (3) zinc, aluminum, and magnesium, or any combinations thereof.

The anode electroactive material comprising zinc can be present in the anode in a number of forms. In some embodiments, the anode electroactive material can be in the form of nanometer-sized particles, micron-sized particles, nanowires, nanotubes, nanobelts or combinations thereof. For example, the anode electroactive material can comprise particles (e.g., spheres, rods, wires, tubes, etc.) having a size in at least on dimension in a range between 1 nanometer (nm) and about 1,000 nm, or between about 1 nm and about 800 nm. In some embodiments, the anode electroactive material can have a size in at least one dimension up to about 100 micrometers (microns) or up to about 10 microns.

The anode 13 can comprise one or more additional components to help stabilize and improve the properties of the anode including a conductive additive. The conductive additive can serve to improve the charge transfer characteristics to the zinc. Various materials can be used including, but not limited to, carbon based conductive materials such as graphite, carbon fiber, carbon black, acetylene black, single walled carbon nanotubes, multi-walled carbon nanotubes, nickel or copper coated carbon nanotubes, graphene, graphyne, graphene oxide, or combinations thereof.

Figures 4A, 4B:
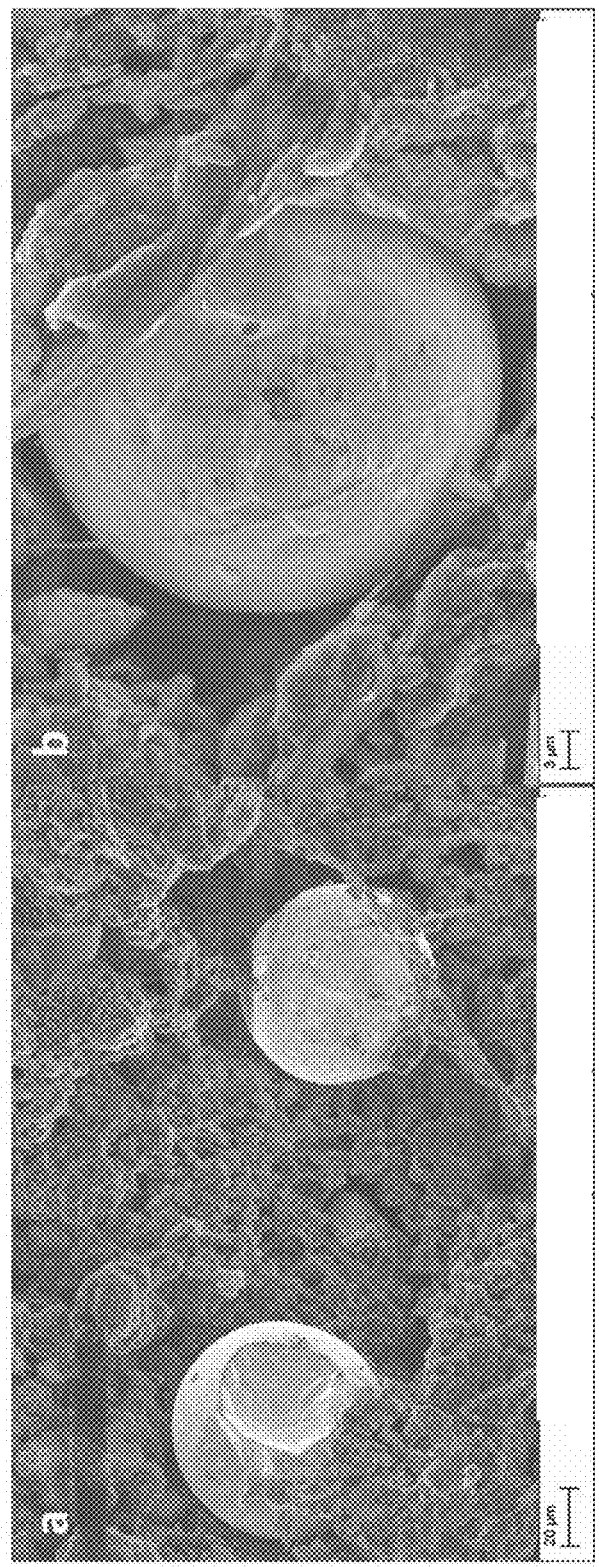
FIG. 4 illustrates a SEM image of zinc in a zinc anode surrounded by carbon nanotubes according to an embodiment.

The conductive materials can be present in an amount sufficient to form a desired structure within the anode. In some embodiments, the conductive additive can be present in an amount sufficient to encapsulate the electroactive particles within the anode material. This can include creating a nest-like structure with the conductive additive surrounding the electroactive particles. An example of such a structure is shown in FIGS. 4A and 4B. As shown, the Zn particles are encapsulated completely in a carbon nanotube framework to create nest-like structures. The resulting encapsulation or nest-like structure can result in an improved electronic pathway for the electroactive Zn particles to react. The conductive additive can be present in any amount sufficient to improve the capacity utilization of the electroactive material. In some embodiments, the conductive additive can be present in an amount of between about 0.01% to about 20% by weight of the anode material 5, or between about 0.05% and about 10% by weight of the anode material 5.

In some embodiments, the anode material 5 can also comprise a stabilizer additive used to reduce hydrogen generation and/or improve charge transfer characteristics to improve zinc plating, thereby potentially reducing dendrite formation. The incorporation of the stabilizer additives can be used to prevent the corrosion of the electroactive materials and provide access to a high fraction of the theoretical capacity (50-100%) of the electroactive material. In some embodiments the stabilizer additive can comprise bismuth, bismuth oxide, copper, copper oxide, bismuth strontium calcium copper oxide, bismuth hydroxide, copper hydroxide, indium, indium oxide, indium hydroxide, or combinations thereof. The stabilizer additive can be present in any suitable amount. In some embodiments, the additive can be present in an amount of between about 0.01% to about 20% by weight of the anode material 5, or between about 0.05% and about 10% by weight of the anode material 5.

In some embodiments, the anode material 5 can also comprise a complexing additive. The complexing additive can serve to localize the electroactive material during the cycling of the anode. The complexing additive can serve to retain the zinc within the anode material during the dissolution/precipitation reactions. The complexing additive can then serve to reduce zinc redistribution within the anode and/or electrolyte. This can help to limit or prevent the formation of dendrites that can grow through or around the separator to result in a short within the battery. The complexing additive can serve to interact with the zinc during the reactions and retain the zinc in position within the anode material. In some embodiments, the complexing additive can comprise calcium hydroxide, titanium oxide, calcium zincate, titanium zincate, strontium titanium oxide, barium titanate, potassium titanate, or combinations thereof. The complexing additive can be present in any suitable amount. In some embodiments, the complexing additive can be present in an amount of between about 0.01% to about 20% by weight of the anode material 5, or between about 0.05% and about 10% by weight of the anode material 5.

The anode material 5 an also comprise a binder to hold the electroactive material and additives together. The binder can be present in an amount of between about 0-10 wt % of the anode material. In some embodiments, the binder comprises water-soluble cellulose-based hydrogels, which were used as thickeners and strong binders, and have been cross-linked with good mechanical strength and with conductive polymers. The binders can be made by physically cross-linking the water-soluble cellulose-based hydrogels with a polymer through repeated cooling and thawing cycles. In some embodiments, the binder can comprise polytetrafluoroethylene (PTFE—commercially available as TEFLON). Mixtures of PTFE with an aqueous binder and some conductive carbon can be used to create rollable binders. In some embodiments, the binder can comprise a hydrogel. Examples of hydrogels include methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride, polyvinylidene difluoride, and polypyrrole. In one such embodiment, a 0-10 wt % solution of water-cased cellulose hydrogen can be cross linked with a 0-10% wt solution of crosslinking polymers by, for example, repeated freeze/thaw cycles, radiation treatment or chemical agents (e.g. epichlorohydrin). The aqueous binder may be mixed with 0-5% PTFE to improve manufacturability.

In some embodiments, the anode material can be applied by itself or applied together with one or more optional current collectors and/or current collector tabs. A current collector can be formed from a conductive material that serves as an electrical connection between the electroactive material in the anode (e.g., the zinc) and an external electrical connection or connections. In some embodiments, the anode current collector 4 can be, for example, nickel, steel (e.g., stainless steel, etc.), nickel-coated steel, nickel plated copper, tin-coated steel, copper plated nickel, copper coated steel, silver coated copper, brass, copper, bismuth, iron, tin, zinc, silver, titanium, magnesium, aluminum, platinum, gold, titanium, half nickel and half copper, or any combination thereof. The anode current collector 4 may be formed into a mesh (e.g., an expanded mesh, woven mesh, etc.), perforated metal, foam, foil, perforated foil, wire screen, a wrapped assembly, or any combination thereof. In some embodiments, the anode current collector can be formed into or form a part of a pocket assembly. A tab (e.g., a portion of the anode current collector 4 extending outside of the anode 13 (e.g., tab 30 as shown in FIG. 3) can be coupled to the anode current collector 4 to provide an electrical connection between an external source and the anode current collector 4.

In some embodiments, the anode material 5 can be adhered to the anode current collector 4 by pressing at, for example, a pressure between 1,000 psi and 20,000 psi (between $6.9 \times 10^6$ and $1.4 \times 10^8$ Pascals). The anode material 5 may be adhered to the anode current collector 4 as a paste in some embodiments and/or as a film of anode material 5.

When assembled as one or more layers of the electrode structure, the thickness of the anode can vary from as thin as about 10 µm to as thick as about 5 mm. The porosity of the electrode can vary from as high as 90% to as low as 1%.

In some embodiments, the addition of the various additives can serve to increase the capacity utilization of the electroactive material. Zn discharges in alkaline electrolyte through a conversion reaction, where it dissolves as zincate ions and precipitates out as zinc oxide. Without wishing to be limited by theory, it is believe that an electroactive particle which is nanometer in size will have a higher surface area and better reactivity than larger particles. In combination with one or more of the other additives, the resulting anode can have an improved capacity utilization. In some embodiments, the use of the electroactive material having a smaller size in addition to the conductive additive can increase the capacity utilization of the anode to about 10%, above about 30%, above about 40%, above about 50%, above about 60%, above about 70%, or above about 80%, or above about 90% of the theoretical capacity of 820 mAh/g. For example the anode can have a capacity utilization of between 10%-100%, 20%-100%, 30%-100, 40%-100%, 50%-100%, 60%-100%, 70%-100%, 80%-100%, or 90%-100% of the theoretical capacity of 820 mAh/g. This utilization can be repeatable across a plurality of charging and discharging cycles.

Returning to FIGS. 1 and 2, the porous zinc electrode in the present devices and methods can be paired with various cathodes 12. The cathode can comprise an active cathode material (e.g., an electroactive material). Suitable materials can include, but are not limited to, manganese oxide, manganese dioxide, copper manganese oxide, hausmannite, manganese oxide, copper intercalated bismuth birnessite, birnessite, todokorite, ramsdellite, pyrolusite, pyrochroite, nickel hydroxide, sintered nickel, nickel oxyhydroxide, potassium permanganate, cobalt oxide, silver oxide, silver, lithium manganese oxide, lithium manganese nickel cobalt oxide, lithium iron phosphate, copper oxide, manganese oxide, lithium vanadium phosphate, vanadium phosphate, vanadium pentoxide, nickel, copper, copper hydroxide, lead, lead hydroxide, lead oxide, zinc intercalating materials, or a combination thereof. In some embodiments, the cathode can be an air electrode and/or carbon electrode.

In some embodiments, the active cathode material can based on one or many polymorphs of $MnO_2$, including electrolytic (EMD), $\alpha$-$MnO_2$, $\beta$-$MnO_2$, $\gamma$-$MnO_2$, $\delta$-$MnO_2$, $\epsilon$-$MnO_2$, or $\lambda$-$MnO_2$. Other forms of $MnO_2$ can also be present such as pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide. In general the cycled form of manganese dioxide in the cathode can have a layered configuration, which in some embodiment can comprise $\delta$-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the $2^{nd}$ electron capacity of the cathode) may be performed and subsequently recharging back to its $Mn^{4+}$ state, resulting in birnessite-phase manganese dioxide.

In some embodiments, the cathode 12 can comprise a mixture of components including the electrochemically active material, a conductive material, a binder, and one or more additional components that can serve to improve the lifespan, rechargeability, and electrochemical properties of the cathode 12.

The addition of a conductive additive such as conductive carbon enables high loadings of an electroactive material in the cathode material 2, resulting in high volumetric and gravimetric energy density. The conductive carbon can be present in a concentration between about 1-30 wt %. Such conductive carbon include single walled carbon nanotubes, multi-walled carbon nanotubes, graphene, carbon blacks of various surface areas, and others that have specifically very high surface area and conductivity. Higher loadings of the electroactive material in the cathode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite, and combinations thereof. When the electroactive material comprises manganese, the birnessite discharge reaction comprises a dissolution-precipitation reaction where $Mn^{3+}$ ions become soluble and precipitate out on the conductive carbon as $Mn^{2+}$. This second electron process involves the formation of a non-conductive manganese hydroxide $[Mn(OH)_2]$ layer on the conductive graphite.

The conductive additive can have a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. In some embodiments, the mass ratio of graphite to the conductive additive can range from about 5:1 to about 50:1, or from about 7:1 to about 28:1. The total carbon mass percentage in the cathode paste can range from about 5% to about 30% or between about 10% to about 20%.

The addition of a conductive component such as metal additives to the cathode material may be accomplished by addition of one or more metal powders such as nickel powder to the cathode mixture. The conductive metal component can be present in a concentration of between about 0-30 wt %. The conductive metal component may be, for example, nickel, copper, silver, gold, tin, cobalt, antimony, brass, bronze, aluminum, calcium, iron or platinum. In one embodiment, the conductive metal component is a powder. When the cathode comprises manganese dioxide, a second conductive metal component can be added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide $[Mn(OH)_2]$, which is non-conductive. This ultimately results in a capacity fade in subsequent cycles. Suitable second component include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal components may be incorporated into the electrode by chemical means or by physical means (e.g. ball milling, mortar/pestle, spex mixture).

In some embodiments a binder can be used in the cathode material. The binder can be present in a concentration of between about 0-10 wt % of the cathode material. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In one embodiment, 0-10 wt. % carboxymethyl cellulose (CMC) solution was cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon can be used to create rollable binders. Using the aqueous-based binder helps in achieving a significant fraction of the two electron capacity with minimal capacity loss over many cycles. In some embodiments, the binder is water-based, has superior water retention capabilities, adhesion properties, and helps to maintain the conductivity relative to an identical cathode using a TEFLON® binder instead. Examples of hydrogels include methyl cellulose (MC), carboxymethyl cellulose (CMC), hydroxypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In one such embodiment, a 0-10 wt % solution of water-cased cellulose hydrogen is cross linked with a 0-10% wt solution of crosslinking polymers by, for example, repeated freeze/thaw cycles, radiation treatment or chemical agents (e.g. epichlorohydrin). The aqueous binder may be mixed with 0-5% TEFLON® to improve manufacturability.

Additional elements can be included in the cathode material including a bismuth compound and/or copper/copper compounds, which together allow improved galvanostatic battery cycling of the cathode. When present as birnessite, the copper and/or bismuth can be incorporated into the layered nanostructure of the birnessite. The resulting birnessite cathode material can exhibit improved cycling and long term performance with the copper and bismuth incorporated into the crystal and nanostructure of the birnessite.

The bismuth compound can be incorporated into the cathode 12 as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between about 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth, or any combination thereof.

The copper compound can be incorporated into the cathode 12 as an organic or inorganic salt of copper (oxidation states 1, 2, 3 or 4), as a copper oxide, or as copper metal (i.e., elemental copper). The copper compound can be present in a concentration between about 1-70 wt %. In one embodiment, the copper compound is present in a concentration between about 5-50 wt %. In another embodiment, the copper compound is present in a concentration between about 10-50 wt %. In yet another embodiment, the copper compound is present in a concentration between about 5-20 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which will not withstand galvanostatic cycling.

The cathodes 12 can be produced using methods implementable in large-scale manufacturing. For a $MnO_2$ cathode, the cathode 12 can be capable of delivering the full second electron capacity of 617 mAh/g of the $MnO_2$. Excellent rechargeable performance can be achieved for both low and high loadings of $MnO_2$ in the mixed material, allowing the cell/battery to achieve very high practical energy densities.

The cathode material 2 can be formed on a cathode current collector 1 formed from a conductive material that serves as an electrical connection between the cathode material and an external electrical connection or connections. In some embodiments, the cathode current collector 1 can be, for example, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, half nickel and half copper, or any combination thereof. The cathode current collector 1 may be formed into a mesh (e.g., an expanded mesh, woven mesh, etc.), perforated metal, foam, foil, perforated foil, wire screen, a wrapped assembly, or any combination thereof. In some embodiments, the current collector can be formed into or form a part of a pocket assembly. A tab (e.g., a portion of the cathode current collector 1 extending outside of the cathode material 2 as shown at the top of the cathode 12 in FIG. 2) can be coupled to the current collector to provide an electrical connection between an external source and the current collector.

In some embodiments, the cathode material 2 can be adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste in some embodiments and/or as a film of cathode material.

In some embodiments, a separator 3 can be disposed between the anode 13 and the cathode 12 when the electrodes are constructed into the battery. The separator 3 forms an electrically insulating barrier between the anode 13 and the cathode 12 while being porous to allow for ionic flow in the electrolyte between the electrodes. By being placed between the electrodes, the separator 3 serves to prevent shorting that could occur due to direct electrical contact between the electrodes. As will be appreciated by one of skill in the art, the separator 3 allows the electrolyte, or at least a portion and/or component thereof, to pass (e.g., cross, traverse, diffuse, etc.) through the electrode separator membrane, to balance ionic flow and sustain the flow of electrons in the battery. In this regard, the separator 3 serves to demarcates the cathode 12 from the anode 13.

The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a microporous film sold under the brand name CELGARD®. In an embodiment, the separator 3 can comprise a FS 2192 SG membrane, which is a polyolefin nonwoven membrane commercially available from Freudenberg, Germany. In some embodiments, the separator can comprise a lithium super ionic conductor (LISICON®), sodium super ionic conductions (NASICON), a sulfonated tetrafluoroethylene (e.g., as sold under the brand name NAFION®), a bipolar membrane, water electrolysis membrane, a composite of polyvinyl alcohol and graphene oxide, polyvinyl alcohol, crosslinked polyvinyl alcohol, or a combination thereof. In some embodiments, the separator membranes may be membranes fabricated from nylon, polyester, polyethylene, polypropylene, poly(tetrafluoroethylene) (PTFE), poly(vinyl chloride) (PVC), polyvinyl alcohol, cellulose or combinations thereof.

In some embodiments, an optional ion selective layer can be used with the separator layer to provide selective control of the transport of certain ions. In some embodiments, a selective layer can comprise inorganic materials including water insoluble hydroxides of metals selected from the alkaline earth metal group. Suitable metal hydroxides can include, but are not limited to, magnesium hydroxide, calcium hydroxide, strontium hydroxide, barium hydroxide, or any combination thereof. The inorganic materials can be formed into a selective layer using a binder. Any suitable binder can be used, including those described herein for use with the anode material and/or the cathode material. Suitable binders can include, but are not limited to, polytetrafluoroethylene, polyvinyl alcohol (PVA), polytetrafluoroethylene (PTFE), carboxymethyl cellulose (CMC), or any combination thereof. A resulting free-standing layer can then be formed and used with the separator. When present, the selective layer can be placed next to the zinc surface (e.g., between the surface of the metallic zinc and one or more separator layers. In some embodiments, the metallic zinc can be laminated and/or enclosed within one or more layers of the selective layer.

The anode in the present devices and methods can be applied in both aqueous systems and nonaqueous systems. The aqueous electrolytes include but are not limited to alkaline electrolyte, neutral electrolyte, acidic electrolyte, aqueous gelled electrolyte. In some embodiments, the electrolyte can comprise an alkaline electrolyte (e.g. an alkaline hydroxide, such as NaOH, KOH, LiOH, ammonium hydroxide, or mixtures thereof). In some embodiments, the electrolyte can comprise an acidic solution, alkaline solution, ionic liquid, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, ammonium hydroxide, perchlorates like lithium perchlorate, magnesium perchlorate, aluminum perchlorate, lithium hexafluorophosphate, $[M^+][AlCl^{4-}](M^+)]$-sulphonyl chloride or phosphoryl chloride cations, 1-ethyl-3-methylimidazolium bis (trifluoromethylsulfonyl)imide, 1-ethyl-3-methylimidazolium trifluoromethane sulfonate, 1-butly-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis(hexamethyldisilazide) in tetrahydrofuran and a combination thereof. In some embodiments, the electrolyte can comprise manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, sodium hydroxide with dissolved zincate ions, potassium hydroxide, potassium hydroxide with dissolved zincate ions potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium hydroxide with dissolved zincate ions, lithium perchlorate, lithium oxalate, lithium fluoride, lithium carbonate, lithium bromate, zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, or a combination thereof. The pH of the electrolyte can vary from 0-15. Suitable nonaqueous electrolytes can include, but are not limited to, organic electrolyte, ionic liquid, polymer solid electrolytes, and combinations thereof.

In some embodiments, the electrolyte selected for the battery can comprise zincate ions within the battery. The zincate ions can serve to localize the zinc during cycling, and the ions can be added as part of the electrolyte. The zincate ions can be added as a salt dissolved in the electrolyte. In some embodiments, the zincate ions can be added up to about 40%, 50%, 60%, 70%, 80%, 90%, 95%, or 99% of the saturation limit of the ions in the electrolyte. In some embodiments, the zincate ions can be present as a saturated solution in the electrolyte.

The battery 10 can then be constructed by placing at least one anode, at least one cathode, a separator disposed between the at least one anode and the at least one cathode, and an electrolyte in the housing. External electrical connections can then allow the battery to be used as a primary or secondary battery. When used as a secondary battery, the battery can be cycled during use by being discharged and charged a plurality of times. In some embodiments, the battery can be cycled within 10%400% of the capacity of the zinc in the anode as a result of the formations described herein.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

To show the beneficial effect of adding carbon nanotubes (CNTs) to a zinc (Zn) anode, a number of baseline Zn anodes were made. The Zn used in this example was purchased from Umicore. The formulations were as follows: a) 80% Zn, 7% CNTs, 5% bismuth oxide, 5% calcium hydroxide and 3% TEFLON®; (b) 80% Zn, 5% bismuth oxide, 10% calcium hydroxide and 5% TEFLON®; (c) 100% Zn metallic foil; (d) 85% Zn, 10% zinc oxide (ZnO) and 5% TEFLON®; and (e) 95% Zn, 5% TEFLON®.

The formulations were cycled at C/20 based on the theoretical 820 mAh/g (where the C-rate is defined as the charge or discharge current divided by the battery's capacity to store an electrical charge in $h^{-1}$ (e.g., 1/hours)). The anodes were pressed on copper or nickel current collectors. They were cycled against a nickel counter electrode and the potential was controlled against a mercury/mercury oxide (Hg/HgO) reference electrode. The electrolyte used was 25% potassium hydroxide (KOH).

Figure 5:
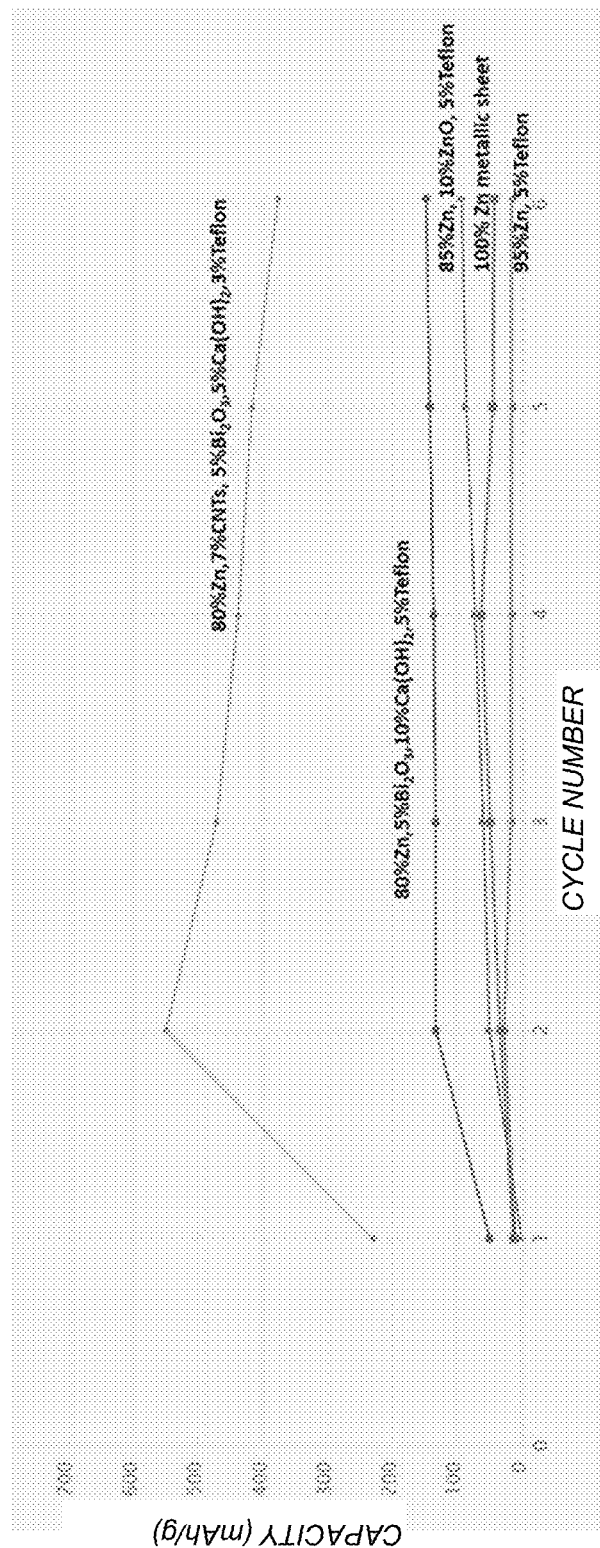
FIG. 5 illustrates a capacity retention for an anode as described in Example 1.

The results of the capacity retention for the respective formulations is shown in FIG. 5. It is clear that the addition of CNTs to the mix results in considerable capacity utilization (~73% of theoretical 820 mAh/g) of the Zn anode. The next best formulation is the 80% Zn, 5% bismuth oxide, 10% calcium hydroxide, and 5% TEFLON®, where >200 mAh/g is obtained. However, the remaining formulations barely exceed 50 mAh/g out of the theoretical 820 mAh/g (~6% of theoretical 820 mAh/g). The remaining formulations are considered to be a failure as energy dense batteries require >20% utilization of their theoretical capacity.

Figure 6:
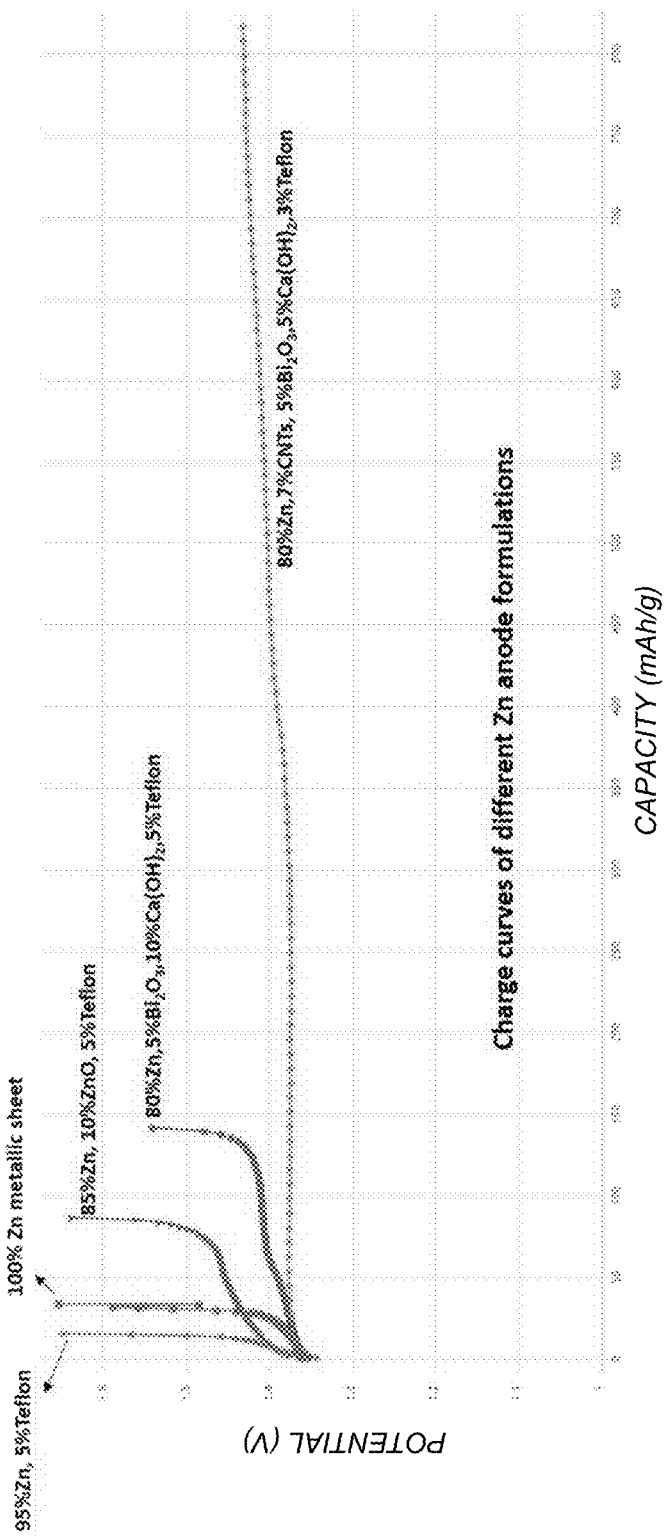
FIG. 6 illustrates exemplary charge curves for different zinc anode formulations as described in Example 2.
Figure 7:
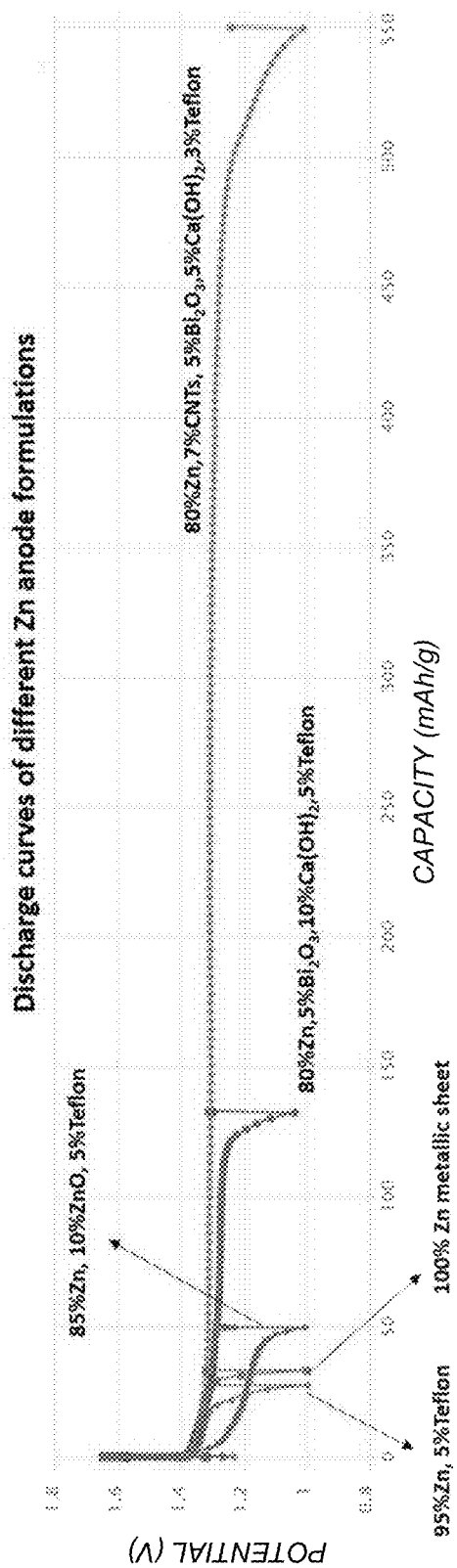
FIG. 7 illustrates exemplary discharge curves for different zinc anode formulations as described in Example 2.

The benefit of adding bismuth oxide and carbon nanotubes is seen in FIGS. 6 and 7. If only bismuth is present in the anode mix then more charge is put into the Zn anode compared to formulations (c), (d) and (e). However, adding CNT's in the mix results in a much better charge curve, where essentially the entire 820 mAh/g is placed into the Zn anode. The overpotential for the formulation with CNTs is considerably lower compared to the other formulations, indicating that Zn charges or plates more efficiently when carbon nanotubes are added in the mix along with bismuth oxide. The result of efficient charging in turn relates to a much better capacity utilization during discharge as shown in FIG. 7.

The advantageous and beneficial properties of adding CNTs in the Zn anode mix is seen in the SEM images shown in FIG. 4, where the Zn particles are encapsulated completely in a carbon nanotube framework to create nest-like structures. One can clearly see from SEM images that this nest-like structure results in a much better electronic pathway for Zn particles to react.

Example 2

Figure 8:
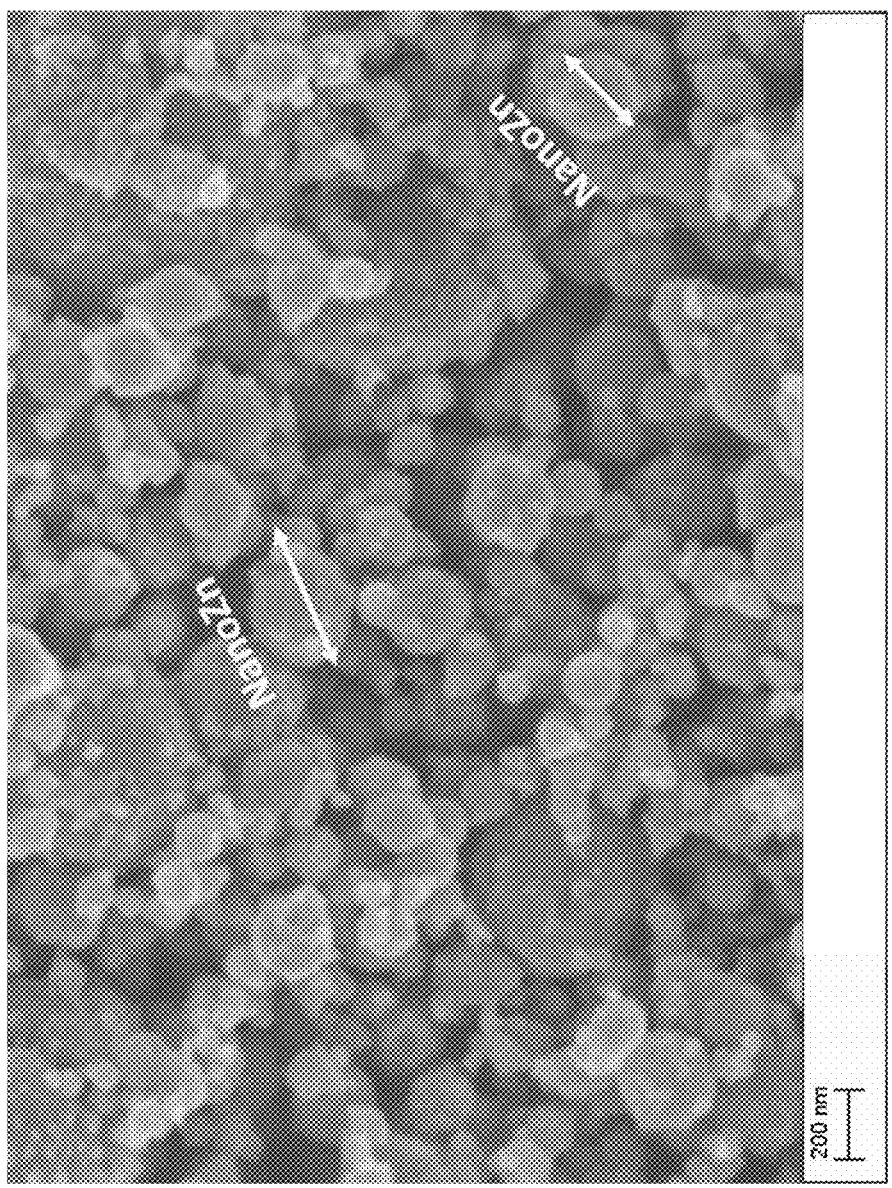
FIG. 8 illustrates a SEM image of nanoscale zinc within an anode according to an embodiment.

The Zn particles as used in example 1 were micron sized particles, which were considered to be big for conversion-type reactions. Zn discharges in alkaline electrolyte through a conversion reactions, where it dissolves as zincate ions and precipitates out as zinc oxide. A Zn particle which is nanometer in size is expected to have a higher surface area and thus, better reactivity. In this example, nanometer sized Zn particles purchased from Sigma-Aldrich, which had a size of around 200 nm, were used. In this Example, these particles of Zn will be called "NanoZn". The SEM image of the NanoZn is shown in FIG. 8.

Figure 9:
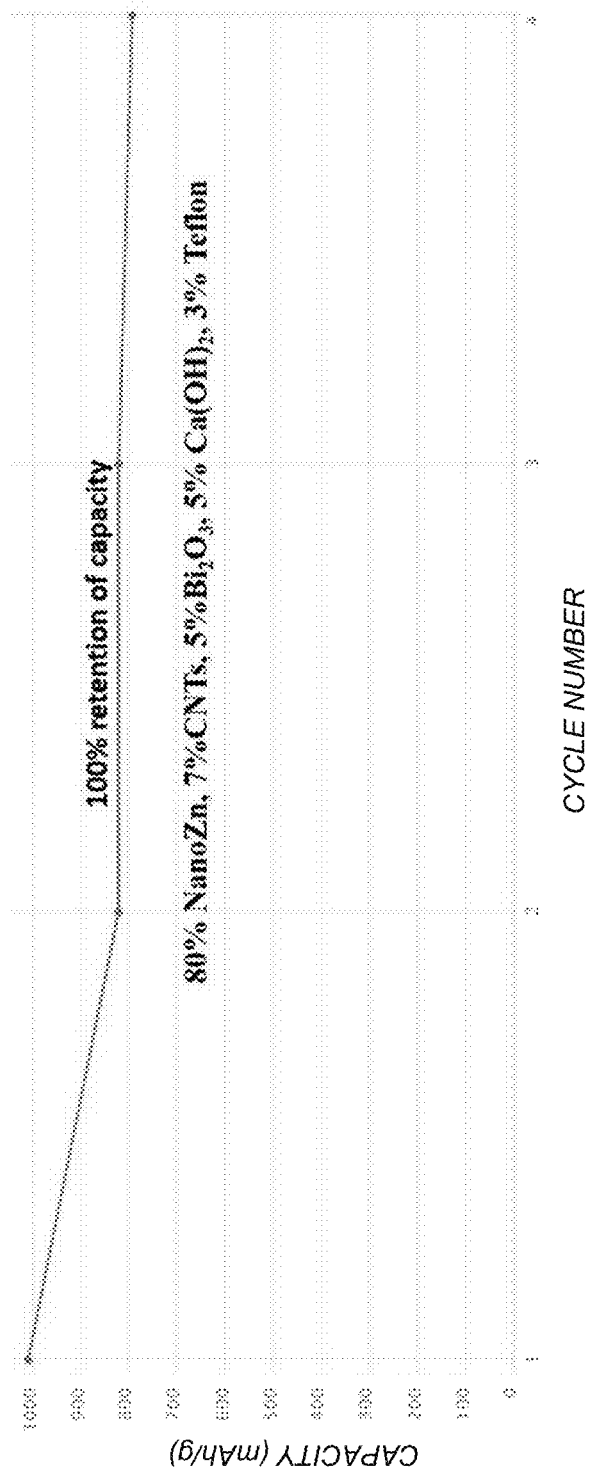
FIG. 9 illustrates a capacity retention chart for an anode as described in Example 2.

A Zn anode with NanoZn particles was made with the following composition: 80% NanoZn, 7% CNTs, 5% bismuth oxide, 5% calcium hydroxide, and 3% TEFLON®, by weight of the anode material. This electrode was cycled against a nickel counter electrode in 45% KOH saturated with zincate ions at C/20. The capacity retention of this electrode is shown in FIG. 9, where it is seen that the anode is able to deliver the complete theoretical capacity of 820 mAh/g. This is also repeatable for a number of cycles, which is a first for such as zinc anode.

Example 3

A full battery was made with sintered nickel as the cathode and NanoZn as the anode. The formulation for NanoZn anode is the same as that in example 2. The battery was cycled at C/5 between 2 and 1V in 45% KOH saturated with zincate ions. Cellophane was used as the separator. The results for this cell are shown in FIGS. 10A and 10B.

Figures 10A, 10B:
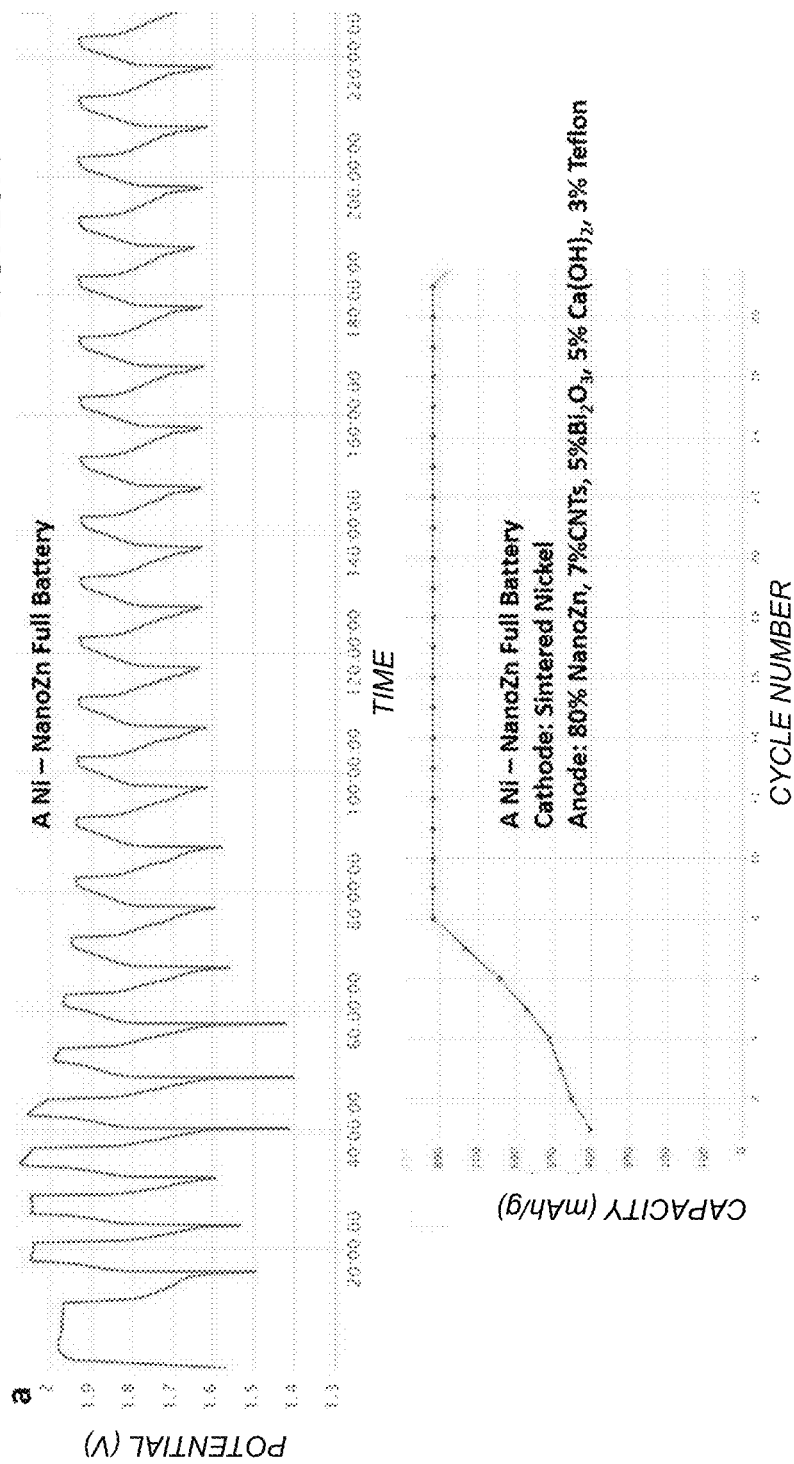
FIG. 10A illustrates potential-time curves for the cell as described in Example 3.
FIG. 10B illustrates a capacity retention chart for the cell as described in Example 3.

The potential-time curves for the cell in FIG. 10A show the stability of both the anode and cathode. As shown in FIG. 10B, the cell is able to deliver the 820 mAh/g capacity of Zn anode repeatedly at C/5. The "nano" nature of the Zn particles allows the anode to be cycled at a faster rate compared to the micron sized particles. This is also a first in literature that a high energy dense Ni—Zn cell is able to cycle at 100% of Zn anodes capacity.

Example 4

A full battery was made with manganese oxide (MnO) as the cathode and NanoZn as the anode. The cathode was composed of 55% MnO with bismuth oxide, copper and carbon nanotubes making the remaining part of the mix. The NanoZn formulation was the same as used in example 2. The cell was designed to obtain the complete capacity of MnO (750 mAh/g) at C/10 in 25% KOH saturated with zincate ions between 2 and 0V as the potential limits. The results of this cell are shown in FIGS. 11A and 11B.

Figure 11A:
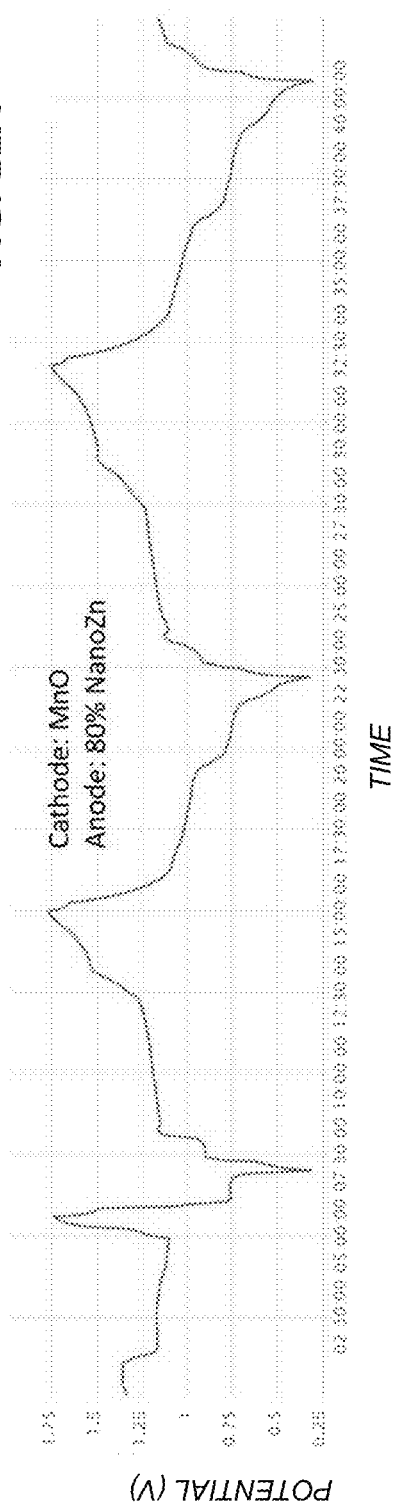
FIG. 11A illustrates potential-time curves for the cell as described in Example 4.
Figure 11B:
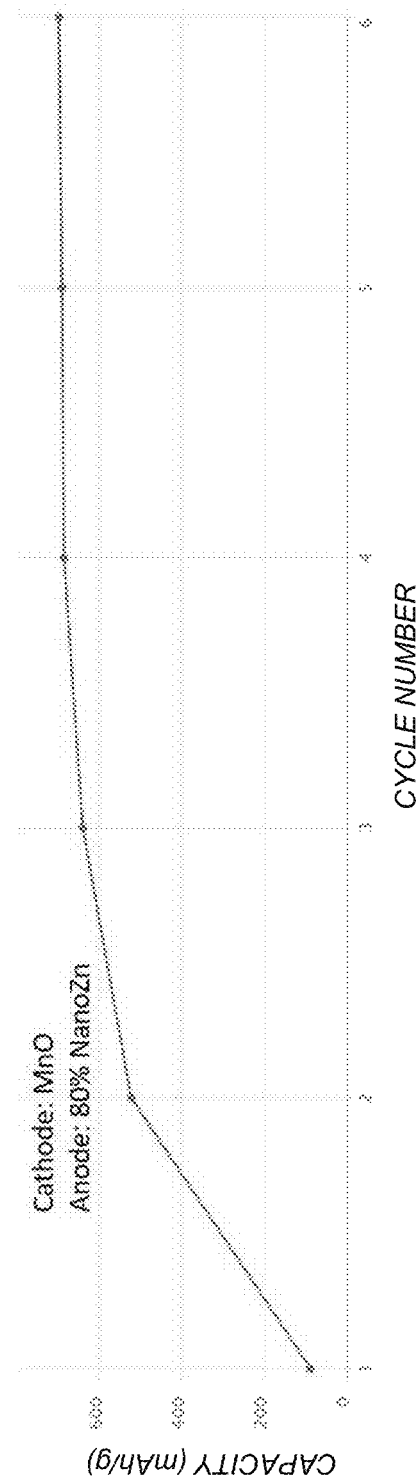
FIG. 11B illustrates a capacity retention chart for the cell as described in Example 4.

The potential-time curves in FIG. 11A show the phase formation of birnessite (delta-$MnO_2$) from MnO, where the curves look stable with no loss in potential. This is important as Zn anodes are usually known to affect the birnessite formation, which does not appear to be the case in the NanoZn anodes. The capacity retention in FIG. 11B shows near 100% utilization, which shows the high energy density of the battery because of high utilization of both cathode and anode.

Example 5

A full battery was made with manganese dioxide ($MnO_2$) as the cathode and NanoZn as the anode pressed on a Zn mesh. The cathode comprised of 85% $MnO_2$ with 10% high surface area carbons like MX-15, MX-25 and BNB-90 and 5% TEFLON®. The NanoZn composition was same as in example 2, but the anode was also pressed on a Zn mesh current collector. The cell was designed to cycle at 20% depth of discharge of one electron $MnO_2$ capacity (308 mAh/g) and 20-30% of 820 mAh/g of NanoZn capacity. The cell was cycled between 2 and 1V in 25% KOH.

The potential-time curves in FIG. 12A show the stable cycling of the cell. The end of discharge potential of the cell also looks very stable, which is normally a problem in limited depth of discharge $MnO_2$—Zn cells. The high capacity utilization of the cathode and anode allows higher energy densities to be obtained out of these cells. The capacity retention is also stable as shown in FIG. 12B, where the cell designed capacity of 20% of 1 electron $MnO_2$ is obtained repeatedly over cycle life.

Having described various electrodes, processes, and devices, specific embodiments can include, but are not limited to:

In a first embodiment, a zinc electrode comprises: an anode material, the anode material comprising: an electroactive material comprising at least one of zinc or a compound comprising zinc; a stabilizer additive comprising at least one of: bismuth, copper, indium, a compound comprising bismuth, a compound comprising copper, a compound comprising indium, or any combination thereof; a conductive additive; and a binder.

A second embodiment can include the zinc electrode of the first embodiment, wherein the electroactive material comprises zinc, zinc oxide, zinc sulfide, zinc selenide, zinc telluride, zinc antimonide, zinc manganese dioxide, zinc iron oxide, zinc iron phosphate, zinc aluminum oxide, brass, an alloy comprising: (1) zinc and aluminum, (2) zinc and magnesium, (3) zinc, aluminum and magnesium, or any combination thereof.

A third embodiment can include the zinc electrode of the first or second embodiment, wherein the additive comprises bismuth, bismuth oxide, copper, copper oxide, bismuth strontium calcium copper oxide, bismuth hydroxide, copper hydroxide, indium, indium oxide, indium hydroxide, or any combination thereof.

A fourth embodiment can include the zinc electrode of any one of the first or third embodiments, further comprising: a complexing additive to localize electroactive zinc or to the zinc electrode.

A fifth embodiment can include the zinc electrode of the fourth embodiment, wherein the complexing additive comprises calcium hydroxide, titanium oxide, calcium zincate, titanium zincate, strontium titanium oxide, barium titanate, potassium titanate, or any combination thereof.

A sixth embodiment can include the zinc electrode of the fourth or fifth embodiment, wherein the zinc electrode has a composition comprising: between 1 wt. % and 98 wt. % of the electroactive material, between 0.1 wt. % and 10% of the stabilizer additive, between 0.1 wt. % and 10% of the complexing additive, between 0.1 wt. % and 10% of the conductive additive, and between 0.1 wt. % and 10% of the binder.

A seventh embodiment can include the zinc electrode of any one of the first or sixth embodiments, wherein the conductive additive is present in an amount configured to encapsulate the electroactive material.

An eighth embodiment can include the zinc electrode of any one of the first or seventh embodiments, wherein the conductive additive comprises graphite, carbon fiber, carbon black, acetylene black, single walled carbon nanotubes, multi-walled carbon nanotubes, nickel or copper coated carbon nanotubes, graphene, graphyne, graphene oxide, or any combination thereof.

A ninth embodiment can include the zinc electrode of any one of the first or eighth embodiments, wherein the binder comprises polytetrafluorethylene, carboxymethyl cellulose, polyvinyl alcohol, polyvinylidene difluoride, or any combination thereof.

A tenth embodiment can include the zinc electrode of any one of the first or ninth embodiments, wherein the electroactive material comprises nanometer-sized particles, micron-sized particles, nanowires, nanotubes, nanobelts, or combinations thereof.

An eleventh embodiment can include the zinc electrode of any one of the first or tenth embodiments, further comprising a current collector, wherein the anode material is electrically coupled to the current collector, and wherein the current collector is made of nickel, stainless steel, copper, brass, bismuth, iron, tin, zinc, silver, titanium, or any combination thereof.

In a twelfth embodiment, a battery comprises: a zinc electrode, wherein the zinc electrode comprises: an electroactive material comprising at least one of zinc or a compound comprising zinc; a stabilizer additive comprising at least one of: bismuth, copper, indium, a compound comprising bismuth, a compound comprising copper, a compound comprising indium, or any combination thereof; a conductive additive; and a binder; and a cathode; an electrolyte; and a separator disposed between the anode and the cathode.

A thirteenth embodiment can include the battery of the twelfth embodiment, wherein the cathode comprises manganese dioxide, copper manganese oxide, hausmannite, manganese oxide, copper intercalated bismuth birnessite, birnessite, todokorite, ramsdellite, pyrolusite, pyrochroite, nickel hydroxide, sintered nickel, nickel oxyhydroxide, potassium permanganate, cobalt oxide, silver oxide, lithium manganese oxide, lithium manganese nickel cobalt oxide, lithium iron phosphate, copper oxide, or any combination thereof.

A fourteenth embodiment can include the battery of the twelfth or thirteenth embodiment, wherein the electrolyte comprises manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, sodium hydroxide with dissolved zincate ions, potassium hydroxide, potassium hydroxide with dissolved zincate ions potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium hydroxide with dissolved zincate ions, lithium perchlorate, lithium oxalate, lithium fluoride, lithium carbonate, lithium bromate, zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, or any combination thereof.

A fifteenth embodiment can include the battery of any one of the twelfth to fourteenth embodiments, wherein the separator comprises lithium super ionic conductor (LISICON), sodium super ionic conductions (NASICON), a sulfonated tetrafluoroethylene sold under the brand name NAFION®, a bipolar membrane, water electrolysis membrane, a composite of polyvinyl alcohol and graphene oxide, a microporous film sold under the brand name CELGARD®, cellophane, and combinations thereof.

A sixteenth embodiment can include the battery of any one of the twelfth to fifteenth embodiments, further comprising: a complexing additive to localize electroactive zinc or to the zinc electrode.

A seventeenth embodiment can include the battery of the sixteenth embodiment, wherein the complexing additive comprises calcium hydroxide, titanium oxide, calcium zincate, titanium zincate, strontium titanium oxide, barium titanate, potassium titanate, or any combination thereof.

An eighteenth embodiment can include the battery of the sixteenth or seventeenth embodiment, wherein the zinc electrode has a composition comprising: between 1 wt. % and 98 wt. % of the electroactive material, between 0.1 wt. % and 10% of the stabilizer additive, between 0.1 wt. % and 10% of the complexing additive, between 0.1 wt. % and 10% of the conductive additive, and between 0.1 wt. % and 10% of the binder.

A nineteenth embodiment can include the battery of any one of the twelfth to eighteenth embodiments, wherein the conductive additive is present in an amount configured to encapsulate the electroactive material.

A twentieth embodiment can include the battery of any one of the twelfth to nineteenth embodiments, wherein the conductive additive comprises graphite, carbon fiber, carbon black, acetylene black, single walled carbon nanotubes, multi-walled carbon nanotubes, nickel or copper coated carbon nanotubes, graphene, graphyne, graphene oxide, or any combination thereof.

In a twenty first embodiment, a method of operating a battery comprises: discharging a battery, wherein the battery comprises: a zinc electrode, wherein the zinc electrode comprises: an electroactive material comprising at least one of zinc or a compound comprising zinc; a stabilizer additive comprising at least one of: bismuth, copper, indium, a compound comprising bismuth, a compound comprising copper, a compound comprising indium, or any combination thereof; a conductive additive; and a binder, a cathode; an electrolyte; and a separator disposed between the anode and the cathode; and charging the battery after discharging the battery, wherein the zinc electrode utilizes between 10-100% of its theoretical capacity of 820 mAh/g during the discharging of the battery.

A twenty second embodiment can include the method of the twenty first embodiment, wherein the electroactive material comprises zinc, zinc oxide, zinc sulfide, zinc selenide, zinc telluride, zinc antimonide, zinc manganese dioxide, zinc iron oxide, zinc iron phosphate, zinc aluminum oxide, brass, an alloy comprising: (1) zinc and aluminum, (2) zinc and magnesium, (3) zinc, aluminum and magnesium, or any combination thereof.

A twenty third embodiment can include the method of the twenty first or twenty second embodiment, wherein the additive comprises bismuth, bismuth oxide, copper, copper oxide, bismuth strontium calcium copper oxide, bismuth hydroxide, copper hydroxide, indium, indium oxide, indium hydroxide, or any combination thereof.

A twenty fourth embodiment can include the method of any one of the twenty first to twenty third embodiments, further comprising: a complexing additive to localize electroactive zinc or to the zinc electrode.

A twenty fourth embodiment can include the method of the twenty fourth embodiment, wherein the complexing additive comprises calcium hydroxide, titanium oxide, calcium zincate, titanium zincate, strontium titanium oxide, barium titanate, potassium titanate, or any combination thereof.

A twenty sixth embodiment can include the method of the twenty fourth or twenty fifth embodiment, wherein the zinc electrode has a composition comprising: between 1 wt. % and 98 wt. % of the electroactive material, between 0.1 wt. % and 10% of the stabilizer additive, between 0.1 wt. % and 10% of the complexing additive, between 0.1 wt. % and 10% of the conductive additive, and between 0.1 wt. % and 10% of the binder.

A twenty seventh embodiment can include the method of any one of the twenty first to twenty sixth embodiments, wherein the conductive additive is present in an amount configured to encapsulate the electroactive material.

A twenty eighth embodiment can include the method of any one of the twenty first to twenty seventh embodiments, wherein the conductive additive comprises graphite, carbon fiber, carbon black, acetylene black, single walled carbon nanotubes, multi-walled carbon nanotubes, nickel or copper coated carbon nanotubes, graphene, graphyne, graphene oxide, or any combination thereof.

A twenty ninth embodiment can include the method of any one of the twenty first to twenty eighth embodiments, wherein the binder comprises polytetrafluorethylene, carboxymethyl cellulose, polyvinyl alcohol, polyvinylidene difluoride, or any combination thereof.

A thirtieth embodiment can include the method of any one of the twenty first to twenty ninth embodiments, wherein the electroactive material comprises nanometer-sized particles, nanowires, nanotubes, nanobelts, or any combination thereof.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new claims may be formulated to such features and/or combinations of such features during the prosecution of the present Application or of any further Application derived therefrom.

The invention claimed is:

1. A zinc electrode comprising:
an anode material, the anode material comprising:
an electroactive material comprising at least one of zinc or a compound comprising zinc, wherein at least one of the zinc or the compound comprising zinc comprises particles having a size in a nanometer range;
a stabilizer additive comprising at least one of: bismuth, copper, indium, a compound comprising bismuth, a compound comprising copper, a compound comprising indium, or any combination thereof;
a conductive additive; and
a binder,
wherein the zinc electrode is configured to utilize between 50-100% of its theoretical capacity of 820 mAh/g during discharge of the zinc electrode.

2. The zinc electrode of claim 1, wherein the electroactive material comprises zinc, zinc oxide, zinc sulfide, zinc selenide, zinc telluride, zinc antimonide, zinc manganese dioxide, zinc iron oxide, zinc iron phosphate, zinc aluminum oxide, brass, an alloy comprising: (1) zinc and aluminum, (2) zinc and magnesium, (3) zinc, aluminum and magnesium, or any combination thereof.

3. The zinc electrode of claim 1, wherein the additive comprises bismuth, bismuth oxide, copper, copper oxide, bismuth strontium calcium copper oxide, bismuth hydroxide, copper hydroxide, indium, indium oxide, indium hydroxide, or any combination thereof.

4. The zinc electrode of claim 1, further comprising: a complexing additive to localize electroactive zinc or to the zinc electrode.

5. The zinc electrode of claim 4, wherein the complexing additive comprises calcium hydroxide, titanium oxide, calcium zincate, titanium zincate, strontium titanium oxide, barium titanate, potassium titanate, or any combination thereof.

6. The zinc electrode of claim 4, wherein the zinc electrode has a composition comprising:
between 1 wt. % and 98 wt. % of the electroactive material,
between 0.1 wt. % and 10% of the stabilizer additive,
between 0.1 wt. % and 10% of the complexing additive,
between 0.1 wt. % and 10% of the conductive additive, and
between 0.1 wt. % and 10% of the binder.

7. The zinc electrode of claim 1, wherein the conductive additive is present in an amount configured to encapsulate the electroactive material.

8. The zinc electrode of claim 1, wherein the conductive additive comprises graphite, carbon fiber, carbon black, acetylene black, single walled carbon nanotubes, multi-walled carbon nanotubes, nickel or copper coated carbon nanotubes, graphene, graphyne, graphene oxide, or any combination thereof.

9. The zinc electrode of claim 1, wherein the binder comprises polytetrafluoroethylene, carboxymethyl cellulose, polyvinyl alcohol, polyvinylidene difluoride, or any combination thereof.

10. The zinc electrode of claim 1, wherein the electroactive material comprises nanowires, nanotubes, nanobelts or combinations thereof.

11. The zinc electrode of claim 1, further comprising a current collector, wherein the anode material is electrically coupled to the current collector, and wherein the current collector is made of nickel, stainless steel, copper, brass, bismuth, iron, tin, zinc, silver, titanium, or any combination thereof.

12. A battery comprising:
a zinc electrode, wherein the zinc electrode comprises:
an electroactive material comprising at least one of zinc or a compound comprising zinc;
a stabilizer additive comprising at least one of: bismuth, copper, indium, a compound comprising bismuth, a compound comprising copper, a compound comprising indium, or any combination thereof;
a conductive additive comprising carbon nanotubes; and
a binder,
a cathode;
an electrolyte; and
a separator disposed between the anode and the cathode, wherein the zinc electrode is configured to utilize between 50-100% of its theoretical capacity of 820 mAh/g during the discharging of the battery.

13. The battery of claim 12, wherein the cathode comprises manganese dioxide, copper manganese oxide, hausmannite, manganese oxide, copper intercalated bismuth birnessite, birnessite, todokorite, ramsdellite, pyrolusite, pyrochroite, nickel hydroxide, sintered nickel, nickel oxyhydroxide, potassium permanganate, cobalt oxide, silver oxide, lithium manganese oxide, lithium manganese nickel cobalt oxide, lithium iron phosphate, copper oxide, or any combination thereof.

14. The battery of claim 12, wherein the electrolyte comprises manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, nitric acid, sulfuric acid, hydrochloric acid, sodium sulfate, potassium sulfate, sodium hydroxide, sodium hydroxide with dissolved zincate ions, potassium hydroxide, potassium hydroxide with dissolved zincate ions potassium permanganate, titanium sulfate, titanium chloride, lithium nitrate, lithium chloride, lithium bromide, lithium bicarbonate, lithium acetate, lithium sulfate, lithium permanganate, lithium nitrate, lithium nitrite, lithium hydroxide, lithium hydroxide with dissolved zincate ions, lithium perchlorate, lithium oxalate, lithium fluoride, lithium carbonate, lithium bromate, zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, or any combination thereof.

15. The battery of claim 12, wherein the separator comprises lithium super ionic conductor (LISICON), sodium super ionic conductions (NASICON), a sulfonated tetrafluoroethylene, a bipolar membrane, water electrolysis membrane, a composite of polyvinyl alcohol and graphene oxide, a microporous film, cellophane, and combinations thereof.

16. The battery of claim 12, further comprising: a complexing additive to localize electroactive zinc or to the zinc electrode.

17. The battery of claim 16, wherein the complexing additive comprises calcium hydroxide, titanium oxide, calcium zincate, titanium zincate, strontium titanium oxide, barium titanate, potassium titanate, or any combination thereof.

18. The battery of claim 16, wherein the zinc electrode has a composition comprising:
between 1 wt. % and 98 wt. % of the electroactive material,
between 0.1 wt. % and 10% of the stabilizer additive,
between 0.1 wt. % and 10% of the complexing additive,
between 0.1 wt. % and 10% of the conductive additive, and
between 0.1 wt. % and 10% of the binder.

19. The zinc electrode of claim 12, wherein the conductive additive is present in an amount configured to encapsulate the electroactive material, and wherein at least one of the zinc or the compound comprising zinc comprises particles having a size in a nanometer range.

20. The battery of claim 12, wherein the conductive additive comprises graphite, carbon fiber, carbon black, acetylene black, single walled carbon nanotubes, multi-walled carbon nanotubes, nickel or copper coated carbon nanotubes, graphene, graphyne, graphene oxide, or any combination thereof.

21. A method of operating a battery, the method comprising:
discharging a battery, wherein the battery comprises:
a zinc electrode, wherein the zinc electrode comprises:
an electroactive material comprising at least one of zinc or a compound comprising zinc;
a stabilizer additive comprising at least one of: bismuth, copper, indium, a compound comprising bismuth, a compound comprising copper, a compound comprising indium, or any combination thereof;
a conductive additive comprising carbon nanotubes; and
a binder;
a cathode;
an electrolyte; and
a separator disposed between the anode and the cathode; and charging the battery after discharging the battery, wherein the zinc electrode utilizes between 50-100% of its theoretical capacity of 820 mAh/g during the discharging of the battery.

22. The method of claim 21, wherein the electroactive material comprises zinc, zinc oxide, zinc sulfide, zinc selenide, zinc telluride, zinc antimonide, zinc manganese dioxide, zinc iron oxide, zinc iron phosphate, zinc aluminum oxide, brass, an alloy comprising: (1) zinc and aluminum, (2) zinc and magnesium, (3) zinc, aluminum and magnesium, or any combination thereof.

23. The method of claim 21, wherein the additive comprises bismuth, bismuth oxide, copper, copper oxide, bismuth strontium calcium copper oxide, bismuth hydroxide, copper hydroxide, indium, indium oxide, indium hydroxide, or any combination thereof.

24. The method of claim 21, further comprising: a complexing additive to localize electroactive zinc or to the zinc electrode.

25. The method of claim 24, wherein the complexing additive comprises calcium hydroxide, titanium oxide, calcium zincate, titanium zincate, strontium titanium oxide, barium titanate, potassium titanate, or any combination thereof.

26. The method of claim 24, wherein the zinc electrode has a composition comprising:

between 1 wt. % and 98 wt. % of the electroactive material,
between 0.1 wt. % and 10% of the stabilizer additive,
between 0.1 wt. % and 10% of the complexing additive,
between 0.1 wt. % and 10% of the conductive additive, and
between 0.1 wt. % and 10% of the binder.

27. The method of claim 21, wherein the conductive additive is present in an amount configured to encapsulate the electroactive material.

28. The method of claim 21, wherein the carbon nanotubes comprise at least one of: single walled carbon nanotubes, multi-walled carbon nanotubes, nickel or copper coated carbon nanotubes, or any combination thereof.

29. The method of claim 21, wherein the binder comprises polytetrafluorethylene, carboxymethyl cellulose, polyvinyl alcohol, polyvinylidene difluoride, or any combination thereof.

30. The method of claim 21, wherein at least one of the zinc or the compound comprising zinc comprises particles having a size in a nanometer range, and wherein the electroactive material comprises nanowires, nanotubes, nanobelts, or any combination thereof.

31. The zinc electrode of claim 1, wherein the conductive additive comprises carbon nanotubes.

* * * * *